(12) United States Patent
Chung et al.

(10) Patent No.: US 8,572,990 B2
(45) Date of Patent: Nov. 5, 2013

(54) SUPERCOOLING APPARATUS

(75) Inventors: Won-Young Chung, Changwon-si (KR);
Jong-Min Shin, Busan (KR);
Deok-Hyun Youn, Gimhae-si (KR);
Jae-Hyun Soh, Paju-si (KR);
Cheol-Hwan Kim, Changwon-si (KR);
Hoon-Bong Lee, Changwon-si (KR);
Su-Cheong Kim, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 844 days.

(21) Appl. No.: 12/679,404

(22) PCT Filed: Sep. 22, 2008

(86) PCT No.: PCT/KR2008/005615
§ 371 (c)(1),
(2), (4) Date: Apr. 6, 2010

(87) PCT Pub. No.: WO2009/038424
PCT Pub. Date: Mar. 26, 2009

(65) Prior Publication Data
US 2010/0205986 A1    Aug. 19, 2010

(30) Foreign Application Priority Data
Sep. 21, 2007    (KR) .................. 10-2007-0096912

(51) Int. Cl.
*G01K 13/00*    (2006.01)
*F25B 41/00*    (2006.01)

(52) U.S. Cl.
USPC ............................................. 62/129; 62/208

(58) Field of Classification Search
USPC ............ 62/208, 126, 129, 338, 342, 440, 441
See application file for complete search history.

(56) References Cited

U.S. PATENT DOCUMENTS

| | | |
|---|---|---|
| 2001/0009100 A1 | 7/2001 | Ohya et al. |
| 2002/0011072 A1 | 1/2002 | Hiraoka et al. |
| 2004/0025527 A1 | 2/2004 | Takahashi et al. |

FOREIGN PATENT DOCUMENTS

| | | |
|---|---|---|
| JP | 3903065 B1 | 1/2007 |
| JP | 3903066 B1 | 1/2007 |
| JP | 2007-271150 A | 10/2007 |
| KR | 10-0859340 B1 | 9/2008 |
| KR | 10-0893878 B1 | 4/2009 |

*Primary Examiner* — Chen Wen Jiang
(74) *Attorney, Agent, or Firm* — Birch, Stewart, Kolasch & Birch, LLP

(57) ABSTRACT

The present invention discloses an apparatus for supercooling which can stably maintain a liquid in a supercooled state at below a phase transition temperature. The apparatus for supercooling, which can maintain a supercooled state of a liquid or contents even below a phase transition temperature, comprises: a storage space for storing a container accommodating a liquid or contents containing the liquid; a cooling means for cooling the liquid or contents or the storage space below the phase transition temperature of the liquid or the contents; and a temperature maintaining unit for applying energy to the surface of the liquid or contents or to a gas near the surface, wherein the liquid or the contents are maintained in a supercooled state by preventing freezing nuclei from being formed on the surface of the liquid or contents or in the gas near the surface by application of energy.

21 Claims, 5 Drawing Sheets

SUPERCOOLING APPARATUS

TECHNICAL FIELD

The present invention relates to an apparatus for supercooling, and more particularly, to an apparatus for supercooling which can stably maintain a liquid in a supercooled state at below a phase transition temperature.

BACKGROUND ART

Supercooling means that a molten object or a solid cooled below a phase transition temperature in a balanced state is not changed. Each material has stable states in each temperature. If the temperature is slowly varied, elements of the material maintain the stable states in each temperature and accompany the variations of the temperature. However, if the temperature is sharply varied, the elements cannot be changed into the stable states in each temperature. Therefore, the elements of the material maintain the stable state of the start temperature, or some of the elements fail to be changed into the state of the final temperature.

For example, when water is slowly cooled, it is not frozen temporarily at a temperature below 0° C. However, when water is supercooled, it has a kind of quasi-stable state. As this unstable balanced state is broken even by a slight stimulus, water tends to be changed into a mare stable state. That is, if a small piece of material is put into the supercooled liquid, or if the liquid is suddenly shaken, the liquid is directly frozen so that the temperature of the liquid can reach the freezing point. Accordingly, the liquid maintains a stable balanced state at the temperature.

In general, an electrostatic atmosphere is made in a refrigerator, and meats and fishes are thawed in the refrigerator at a minus temperature. In addition, fruits are kept fresh in the refrigerator.

This technology uses supercooling. Supercooling means that a molten object or a solid cooled below a phase transition temperature in a balanced state is not changed.

This technology is mentioned in Korea Laid-Open Patent Official Gazette 2000-0011081 disclosing an electrostatic field processing method, an electrostatic field processing apparatus, and electrodes therefor.

FIG. 1 is a view illustrating an embodiment of a conventional apparatus for thawing and freshness keeping. A cooling box 1 includes an insulation 2 and an outer wall 5. A temperature control device (not shown) is installed in the cooling box 1. A metal shelf 7 installed in the cooling box 1 has a two layer structure. Vegetables, meats or marine products are minted on each layer for thawing, freshness keeping or ripening. The metal shelf 7 is isolated from the bottom of the cooling box 1 by insulators 9. A high voltage generating device 3 can generate 0 to 5000V of DC and AC voltages. The inner surface of the insulation 2 is covered with an insulating plate 2a such as vinyl chloride. A high voltage cable 4 for outputting the voltage of the high voltage generating device 3 accesses the metal shelf 7 through the cuter wall 5 and the insulation 2.

When the user opens a door 6 installed on the front surface of the cooling box 1, a safety switch 13 (refer to FIG. 2) is turned off to block the output of the high voltage generating device 3.

FIG. 2 is a circuit view illustrating the circuit configuration of the high voltage generating device 3. 100V of AC is supplied to a primary side of a voltage adjusting transformer 15. Reference numeral 11 denotes a power lamp and 19 denotes an operation state lamp. When the door 6 is closed and the safety switch 13 is on, a relay 14 is operated. The operation of the relay 14 is displayed by a relay operation lamp 12. Relay contact points 14a, 14b, and 14c are closed by the operation of the relay 14, and 100V of AC is applied to the primary side of the voltage adjusting transformer 15.

The applied voltage is adjusted by an adjusting knob 15a at a secondary side of the voltage adjusting transformer 15. The adjusted voltage is displayed on a voltmeter. The adjusting knob 15a is connected to a primary side of a boosting transformer 17 at the secondary side of the voltage adjusting transformer 15. The boosting transformer 17 boosts a voltage at a rate of 1:50. For example, when 60V of voltage is applied, it is boosted to 3000V.

One end $O_1$ of the secondary side output of the boosting transformer 17 is connected to the metal shelf 7 isolated from the cooling box 1 through the high voltage cable 4, and the other end $O_2$ of the output is earthed. Since the cuter wall 5 is earthed, if the user contacts the cuter wall 5 of the cooling box 1, he/she does not receive an electric shock. In FIG. 1, the metal shelf 7 exposed in the cooling box 1 must be maintained in an insulated state. It is thus necessary to separate the metal shelf 7 from the walls of the cooling box 1 (the air performs insulation). If the contents 8 mounted on the metal shelf 7 contact the walls of the cooling box 1, the current flows to the grand through the walls of the cooling box 1. Drop of the applied voltage is prevented by adhering the insulating plate 2a to the inner walls. When the metal shelf 7 is not exposed but covered with vinyl chloride, an electric field atmosphere is made in the whole cooling box 1.

In the conventional art, since an electric field or a magnetic field is applied to the contents to be cooled and stored so that the contents can enter a supercooled state, a complicated apparatus for generating an electric field or a magnetic field should be provided in order to house the contents in the supercooled state, and a high power consumption for the generation of an electric field or a magnetic field is required. In addition, such an apparatus for generating an electric field or magnetic field has to additionally have an apparatus (for example, an electric field or magnetic field shielding structure, interrupting device, etc.) for the user safety upon generation and interception of an electric field or magnetic field the to high power.

DISCLOSURE OF INVENTION

Technical Problem

An object of the present invention is to provide an apparatus for supercooling which can stably establish and maintain a supercooled state of contents.

Another object of the present invention is to provide an apparatus for supercooling which can maintain a supercooled state of contents by controlling the temperature of the surface of the contents or the temperature above the surface thereof, apart from the cooling of the contents.

Still another object of the present invention is to provide an apparatus for supercooling which can maintain a supercooled state of contents by including components simpler than those in the conventional art and by low power consumption.

Yet another object of the present invention is to provide an apparatus for supercooling which can prevent the formation of freezing nuclei more reliably in a supercooled state of contents and control the temperature of the contents in the supercooled state.

Technical Solution

In order to achieve the above-described objects of the invention, there is provided an apparatus for supercooling, which can maintain a supercooled state of a liquid or contents even below a phase transition temperature, comprising: a storage space for storing a container accommodating a liquid or contents containing the liquid; a cooling means for cooling the liquid or contents or the storage space below a phase transition temperature of the liquid or the contents; and a temperature maintaining unit for applying energy to the surface of the liquid or contents or to a gas near the surface, wherein the liquid or the contents are maintained in a supercooled state by preventing freezing nuclei from being formed on the surface of the liquid or contents or in the gas near the surface by application of energy.

Further, the temperature maintaining unit prevents the formation of freezing nuclei by temperature control by maintaining the temperature of the surface of the liquid or contents or the temperature of the gas near the surface higher than a temperature of the maximum ice crystal generation zone.

Further, the temperature maintaining unit prevents the formation of freezing nuclei reliably by maintaining the temperature of the surface of the liquid or contents or the temperature of the gas near the surface higher than a phase transition temperature.

Further, the cooling means varies the temperature of the liquid or contents by varying the cooling temperature below the temperature of the maximum ice crystal generation zone of the liquid or contents, or fixedly maintains the cooling temperature, thereby controlling the temperature of the liquid or contents in the supercooled state by application of energy and control of the cooling temperature.

Further, the apparatus for supercooling comprises a control means for operating the temperature maintaining unit before the cooling temperature by the cooling means reaches the temperature of the maximum ice crystal generation zone of the liquid or contents.

Further, the apparatus for supercooling comprises a control means for operating the temperature maintaining upon freezing of the liquid or contents unit until freezing is released.

Further, the apparatus for supercooling comprises a thawing means for releasing freezing of the liquid or contents upon freezing of the liquid or contents.

Further, the temperature maintaining unit comprises a heat source generating unit for forcibly raising the temperature of at least one of the surface of the liquid or contents, the gas near the surface, and the container.

Further, the apparatus for supercooling comprises a blocking member for maintaining the cooling of the liquid or contents by the cooling means by blocking a temperature rise caused by the heat source generating unit.

Further, the heat source generating unit is a heater which is located on the upper side of the container or on the cuter side of the container near the surface of the liquid or contents, for generating heat by applied power.

Further, the heat source generating unit is an ultrasonic oscillator is located at the bottom surface of the container or the inside bottom surface of the container, for generating ultrasonic waves by applied power.

Further, the heat source generating unit comprises a heat generating metal part located on the top side of the container or on the cuter side of the container near the surface of the liquid or contents and a working coil spaced a predetermined gap apart from the heat generating metal part, for generating an electromagnetic force by applied power heat and allowing the heat generating metal part to execute heat generation.

Further, the temperature maintaining unit is a heat median supply means for allowing a heat transfer median having a higher temperature than that of the maximum ice crystal generation zone of the liquid or contents to enter the vicinity of the surface of the liquid or contents or the vicinity of the container or to be formed in the vicinity of the surface of the liquid or contents or the vicinity of the container.

Further, the apparatus for supercooling comprises a blocking member for maintaining the cooling of the liquid or contents by the cooling means by blocking the heat transfer medium from the heat median supply means or the heat from the heat transfer median.

Further, the heat median supply means comprises a heater for heating air serving as the heat transfer median and an inlet duct for guiding the heated air to the vicinity of the surface of the liquid or contents or the vicinity of the container.

Further, the storage space is provided within a freezing chamber, and the heat medium supply means comprises an inlet duct for guiding the cool air or air serving as the heat transfer median in a refrigerating chamber to the vicinity of the surface of the liquid or contents or the vicinity of the container and a damper for executing the introduction and blocking of the cool air or air in the refrigerating chamber.

Further, the heat transfer median is formed on the inside surface of the storage space, and a receiving groove is formed for inserting and receiving part of the container.

Further, the receiving groove is formed on an insulation member attached to the storage space Further, the apparatus for supercooling comprises a sensing unit for sensing the temperature of the surface of the liquid or contents or the temperature of the gas above the surface and a control means for controlling the temperature maintaining unit according to the sensed temperature.

Further, the apparatus for supercooling comprises a judging means for judging the type of the liquid or contents.

Further, the temperature maintaining unit operates in conjunction with an input unit for acquiring a user's input.

Advantageous Effects

The apparatus for supercooling according to the present invention can stably maintain the freshness or quality of contents for a long period of time by stably establishing and maintaining a supercooled state of the contents.

The apparatus for supercooling according to the present invention can establish and maintain a supercooled state only by temperature control by controlling the temperature of the surface of the contents or the temperature above the surface thereof to maintain a supercooled state of the contents, apart from the cooling of the contents.

The apparatus for supercooling according to the present invention can improve the productivity and efficiency of the supercooling apparatus by maintaining a supercooled state of contents by including components simpler than those in the conventional art and by low power consumption.

The apparatus for supercooling according to the present invention can directly control a maintenance state of contents by preventing the formation of freezing nuclei more reliably in a supercooled state of the contents and controlling the temperature of the contents in the supercooled state.

MODE FOR THE INVENTION

The present invention will now be described in detail with reference to the accompanying drawings.

Figure 1:
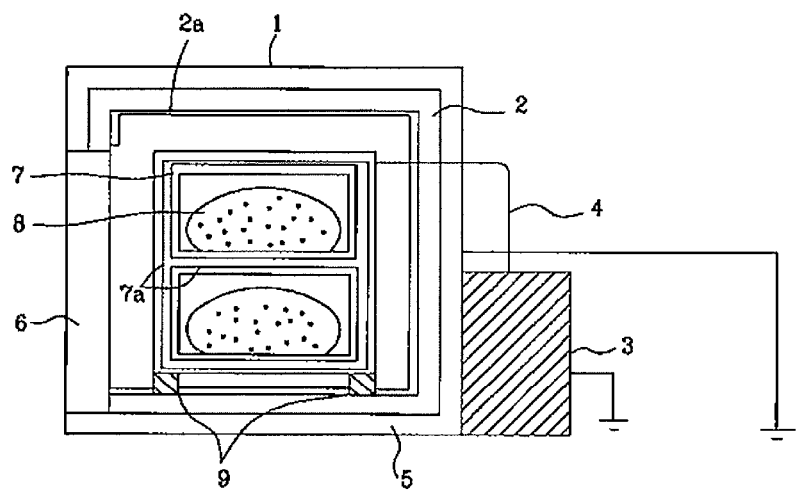
FIG. 1 is a view illustrating an embodiment of a conventional apparatus for thawing and freshness keeping.
Figure 2:
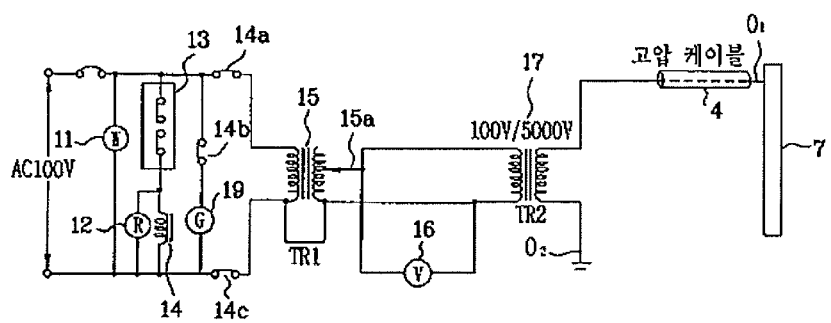
FIG. 2 is a circuit view illustrating the circuit configuration of the high voltage generating device.
Figure 3:
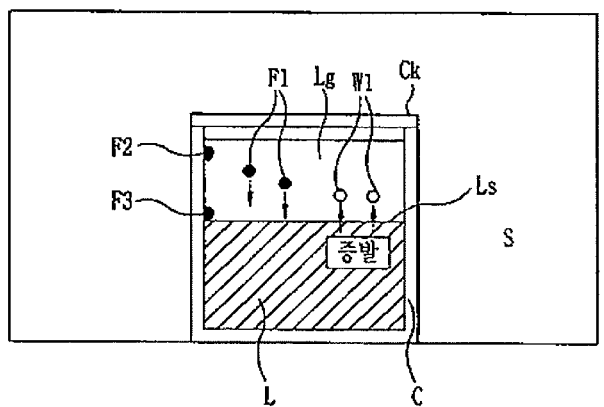
FIG. 3 is a view showing a process of forming freezing nuclei in a liquid being cooled.

FIG. 3 is a view showing a process of forming freezing nuclei in a liquid being cooled.

As shown in FIG. 3, a container C accommodating a liquid is cooled in a cooling space S.

It is assumed that a cooling temperature of the cooling space S is cooled, for example, from an ambient temperature down to 0° C. (phase transition temperature of water) or below a phase transition temperature of the liquid L. When this cooling is performed, a supercooled state of water or liquid L is maintained, for example, below a temperature (−1 to −5° C.) of the maximum ice crystal generation zone of water in which a maximum amount of ice crystals is generated or at a cooling temperature below the maximum ice crystal generation zone of liquid L.

During this cooling, evaporation from the liquid L occurs, and thus a vapor W1 is introduced into a gas (or space) Lg within the container C. If the container C is closed by a lid Ck, the gas Cg may turn into a supersaturated state die to the evaporated vapor W1. However, in the present specification, the container C may selectively comprise a cover Ck, and if included, this can prevent direct introduction of cool air of a cooling space or prevent the temperature of the surface of the liquid L or the temperature of the gas Lg above the surface from being cooled by cool air to a certain extent.

As the cooling temperature reaches or passes through a temperature of the maximum ice crystal generation zone of liquid L, freezing nuclei F1 are formed in the gas Lg or freezing nuclei F2 are formed on the inner wall of the container. Alternatively, condensation occurs at a portion where the surface Ls of the liquid L and the inner wall (almost matching to the cooling temperature of the cooling space S), and this condensed liquid L may be formed as freezing nuclei F3 which are ice crystals.

For instance, the freezing nuclei F1 in the gas Lg descend and permeate the liquid L through the surface Ls, the supercooled state of the liquid L is released to cause freezing of the liquid L, thereby releasing the supercooling of the liquid L.

Alternatively, as the freezing nuclei F3 are brought into contact with the surface Ls of the liquid L, the supercooled state of the liquid L is released to cause freezing of the liquid L.

As described above, in the process of forming freezing nuclei (F1 to F3), when the liquid L is housed at a temperature below the maximum ice crystal generation zone of the liquid L, vapor is evaporated from the liquid L, and hence the supercooled state of the liquid L is released due to the freezing of the vapor on the surface Ls of the liquid L and the freezing of the vapor on the inner wall of the container C near the surface Ls of the liquid L.

Figure 4:
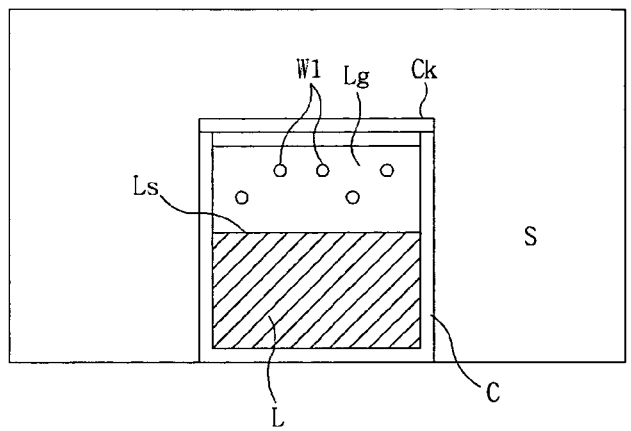
FIG. 4 is a view showing a process of preventing formation of freezing nuclei applied to the apparatus for supercooling according to the present invention.

FIG. 4 is a view showing a process of preventing formation of freezing nuclei applied to the apparatus for supercooling according to the present invention.

In FIG. 4, in order to continuously maintain a vapor W1 state by preventing freezing of vapor W1 in the gas Lg, the temperature on the surface Ls of the gas Lg or liquid L is higher than the temperature of the maximum ice crystal generation zone of the liquid L, more preferably, the phase transition temperature of the liquid L. Further, in order to prevent freezing when the surface Ls of the liquid L is brought in contact with the inner wall of the container C, the temperature of the surface Ls of the liquid L is higher than the temperature of the maximum ice crystal generation zone of the liquid L, more preferably, the phase transition temperature of the liquid L.

Accordingly, the liquid L in the container C maintains a supercooled state at a temperature below the phase transition temperature or below the maximum ice crystal generation zone of the liquid L.

While the above-described FIGS. 3 and 4 have been described with respect to the liquid L for illustrative purpose, contents containing liquid also can be kept fresh for a long period of time by constantly supercooling the liquid in the contents. Thus, the stored contents can be maintained in a supercooled state below a phase transition temperature by applying the above process.

Forms of energy applied to the present invention may include heat energy, electrical or magnetic energy, ultrasonic energy, light energy, and the like.

Figure 5:
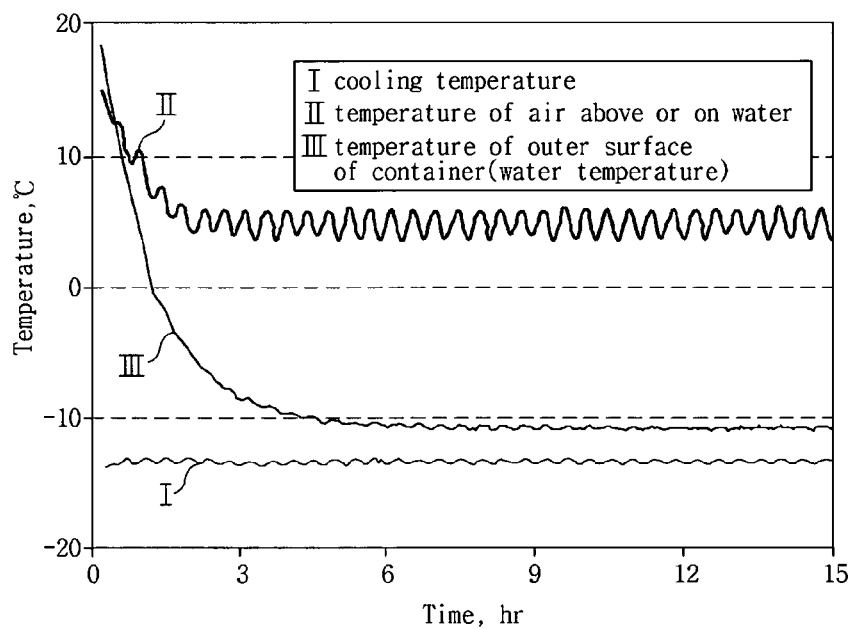
FIG. 5 is a graph showing a supercooled state of water according to FIG. 4.

FIG. 5 is a graph showing a supercooled state of water according to FIG. 4. The graph of FIG. 5 is a temperature graph measured in a state the principle according to FIG. 4 is applied when the liquid L is water.

As shown in FIG. 5, line I denotes a cooling temperature curve of the cooling space S, line II denotes a temperature curve of the gas Lg (air) above or on the water surface in the container C, and line III denotes a temperature of the outer surface of the container C. The temperature of the outer surface of the container C is substantially the same as the temperature of the water in the container C.

As shown therein, when the cooling temperature is maintained at about −13 to −14° C. (refer to line I), if the temperature of the gas Lg above or on the water surface in the container C is maintained at about 4 to 6° C. which is higher than the temperature of the maximum ice crystal generation zone of water, a supercooled state for maintaining a liquid state is stably maintained for a long time while maintaining the temperature of the water in the container C at about −11° C. which is below a temperature of the maximum ice crystal generation zone of water.

In FIG. 5, as the cooling is performed, energy begins to be applied to the water surface or onto the gas Lg above the surface before the temperature of the water reaches a temperature of the maximum ice crystal generation zone, more preferably, before the temperature of the water reaches a phase transition temperature, so that the water can enter and maintain a supercooled state more stably.

In the following, as shown in FIG. 4, the apparatus for supercooling according to the present invention for preventing the formation of freezing nuclei will be described by an embodiment.

Figure 6:
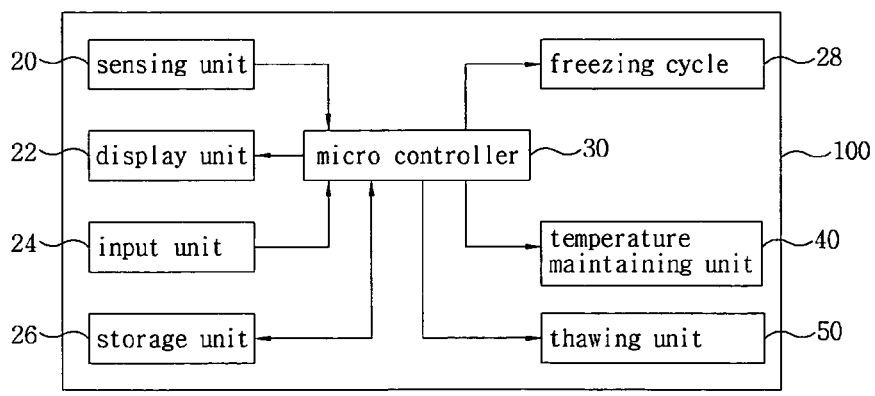
FIG. 6 is a block diagram of an apparatus for supercooling according to the present invention.

FIG. 6 is a block diagram of an apparatus for supercooling according to the present invention. The supercooling apparatus 100 includes a sensing unit 20 for sensing a state of a storage space or a state of a liquid stored in a container (for example, temperature, release of a supercooled state, etc.), a display unit 22 for displaying an operation state of the supercooling apparatus 100, an input unit 24 for enabling the user to input a degree of cooling (setting of a supercooling temperature of the contents, setting of a cooling temperature, etc.), information on the liquid and the like, a storage unit 26 for storing a state of the storage space or the liquid, a degree of cooling, information on the liquid, etc., a freezing cycle 28 for cooling the storage space, a temperature maintaining unit 40 for controlling the temperature of the surface of the liquid or the temperature of a gas above the surface, a thawing unit 50 for thawing the liquid or contents in the container, a micro controller 30 for controlling freezing or refrigerating of the supercooling apparatus 100, and maintaining the liquid in the supercooled state using the supercooling phenomenon. Although a power supply unit (not shown)to apply power to the above-described components is omitted, the configuration of the power supply unit is easily understood by the ordinary people in the art to which the present invention pertains.

In detail, the sensing unit 20 senses or stores the state of the storage space, the state of the liquid stored in the storage space, the temperature of the surface of the liquid or the temperature of the gas above the surface, and the like, and informs the micro controller 30 of the sensing result. For example, the sensing unit 20 can be a means for storing information on the volume of the storage space, which is a state of the storage space, a thermometer for sensing the temperature of the storage space or the liquid or the temperature of the surface of the liquid or the temperature of the gas above the surface, or a hardness meter, scale, optical sensor (or laser sensor) or pressure sensor for judging whether the liquid or the like has been stored in the storage space, whether the supercooling of the liquid is released, or the type, volume, and mass of the liquid or the like.

The display unit 22 can basically display a freezing temperature, a refrigerating temperature and the service type of the dispenser, and additionally displays the current execution of the supercooling node and a released state of the supercooling of the liquid (that is, a state in which the freezing of the liquid is being performed).

The input unit 24 enables the user to input execution and selection of the supercooling mode for the storing space or the contents and setting of a supercooling temperature of liquid or the like in a supercooled state, as well as temperature setting for general freezing and refrigerating control, and selection of a service type (flake ice, water, etc.) of a dispenser. In addition, the user can input information on the liquid such as the kind of the liquid, the temperature of the maximum ice crystal generation zone of the liquid, the phase transition temperature of the liquid, the mass of the liquid, and the volume of the liquid, through the input unit 24. The input unit 24 can be a barcode reader or an RED reader for providing the information on the liquid to the micro controller 30. In addition, the input unit 24 is connected to the temperature maintaining unit 40 (or connected through the micro controller 30) for enabling the user to acquire an operation input of the temperature maintaining unit 40 so as to allow the temperature maintaining unit 40 to operate.

The storage unit 26 stores a state of the storage space or the liquid, the temperature of the surface of the liquid or the temperature of the gas above the surface, a degree of cooling (supercooling temperature, cooling temperature using the freezing cycle 28), information on the liquid, and the like, which are sensed by the sensing unit 20 or the input unit 24. In addition, the storage unit 26 may store information on the temperature of maximum ice crystal generation zone according to the type of the liquid.

Next, the freezing cycle 28 is classified into indirect cooling and direct cooling according to a method of cooling the contents. Either of the cooling types is applicable to the supercooling apparatus 100.

The temperature maintaining unit 40 is a means for applying energy so as to prevent ice crystals from being generated within the gas in the container and/or at a contact portion between the inner wall of the container and the surface of the liquid by maintaining the temperature of the gas on or near the surface of the liquid and the temperature of the gas above the surface higher than the temperature of the maximum ice crystal generation zone of the liquid, more preferably, higher the phase transition temperature of the liquid. Forms of this energy that the temperature maintaining unit 40 can use include heat energy, ultrasonic energy, etc.

Alternatively, the temperature maintaining unit 40 may use a thermostatic material for maintaining the cooling operation using the freezing cycle 28 at a constant temperature higher than the temperature of the maximum ice crystal generation zone of the liquid or higher than the phase transition temperature of the liquid. Examples of this thermostatic material include a filling material, an antifreeze solution and the like.

The thawing unit 50 is a means for thawing the liquid or the contents by applying heat energy to the liquid or the contents upon freezing of the liquid or the like by control of the micro controller 30. The thawing unit 50 is configured in a heat generating heater or coil form to rapidly emit heat.

The micro controller 30 basically controls freezing and refrigerating, and further executes the supercooling operation according to the present invention.

The micro controller 30 executes the cooling of the storage space by controlling the freezing cycle 28. In the general freezing mode, the cooling temperature is maintained, for example, at −18 to −22° C., or in the supercooling mode, the cooling temperature is the same as a general cooling temperature or maintained below a temperature of the maximum ice crystal generation zone of the liquid. The micro controller 30 can control the temperature of the contents in the supercooled state by varying the cooling temperature in the storage space by executing user's setting of the cooling temperature by the input unit 24 or by executing setting of the cooling temperature according to information on the liquid.

In addition, the micro controller 30 acquires information on the liquid from the sensing unit 20 or the input unit 24, and judges a cooling temperature and temperature of the maximum ice crystal generation zone of the liquid corresponding to the acquired information, thereby executing the corresponding cooling operation. For example, when the type of the liquid is judged, the corresponding temperature of the maximum ice crystal generation zone can be acquired, or the temperature of the maximum ice crystal generation zone of the liquid stored in the storage unit 26 can be read cut.

As the liquid in the container to be stored in the storage space is cooled, the temperature of the storage space using the freezing cycle 28 is sensed by the sensing unit 20, and the micro controller 30 initiates a temperature maintenance operation for maintaining the temperature of the surface of the liquid or the temperature of the gas above the surface higher than the temperature of the maximum ice crystal generation zone of the liquid by operating the temperature maintaining unit 40. If the temperature of the storage space is dropped below the temperature of the maximum ice crystal generation zone of the liquid, the possibility of freezing nuclei on the surface of the liquid in the container and in the gas above the surface abruptly increases. Thus, it is preferable to operate the temperature maintaining unit 40 before the dropping. More preferably, the temperature maintaining unit 40 is operated above the phase transition temperature of the liquid to remarkably reduce the possibility of freezing nuclei formation.

The micro controller 30 allows the liquid to maintain a stable supercooled state by maintaining the cooling temperature of the storage space below the temperature of the maximum ice crystal generation zone of the liquid and maintaining the temperature of the surface of the liquid or the temperature of the gas above the surface higher than the temperature of the maximum ice crystal generation zone of the liquid.

The micro controller 30 can maintain the supercooled state of the contents, such as the liquid or the like, by controlling the temperature maintaining unit 40, and can increase or decrease the temperature of the contents, such as the liquid or the like, in the supercooled state by controlling a degree of cooling of the freezing cycle 28.

In addition, during the maintenance of the supercooled state of the liquid, the supercooled state of the liquid may be released die to an external shock on the liquid, and thus a freezing (slushing) process may be performed in the container. In the event of such a freezing of the liquid, the micro controller 30 activates the operation of the temperature maintaining unit 40 to maintain the temperature of the surface of the liquid or the temperature of the gas above the surface above the phase transition temperature of the liquid, thereby thawing the frozen liquid. The freezing of the liquid can be judged, for example, by a change in the temperature sensed by the sensing unit 20 (for example, in case that the water maintained at −5° C. undergoes an abrupt temperature change from −5° C. to 0° C.). In addition, the micro controller 30 can execute a thawing operation by the thawing unit 50. In addition, the micro controller 30 may execute thawing by simultaneously or selectively controlling the temperature maintaining unit 40 and the thawing unit 50.

FIGS. 7 to 13 are embodiments of a temperature maintaining unit. In these embodiments, there are provided a first sensing unit 20a for sensing the temperature of the cooling space S, a second sensing unit 20b attached to the cuter surface of the container C for sensing the temperature of the liquid L, and a third sensing unit 20c attached to the inner surface of the container C for sensing the temperature of the gas above the surface of the liquid L.

The temperature maintaining unit 40 of FIGS. 7 to 10 is configured in the form of a heat sauce generating unit for forcibly raising the temperature of the surface of the liquid or the temperature of the gas above the surface or the temperature of the container C.

Figure 7:
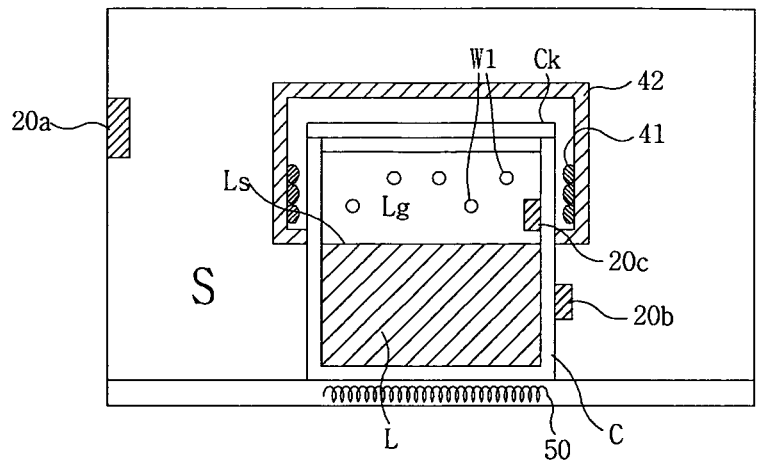
FIGS. 7 to 13 are embodiments of a temperature maintaining unit.

First, the temperature maintaining unit 40 of FIG. 7 comprises a heater 41 for generating heat by applied power and a blocking unit 42 for minimizing the effect on the cooling operation of the cooling space S by blocking the heat from the heater 41 from being directly transferred to the cooling space S.

As shown therein, the heater 41 may be comprised of a heat generating coil or the like minted on the inner side face of the blocking unit 42 for executing a heat generating operation, and may execute a heat generating operation, with at least one part being in contact with the container C or the lid Ck.

The blocking unit 42 has the function of fixing the heater 41 and has a structure of being attached to the container C or the lid Ck while allowing heat from the heater 41 to be transferred only to the surface Ls of the liquid L or to the gas Lg on the surface Ls or to the container C. Especially, the blocking unit 42 is formed or attached at a position higher than the surface Ls of the liquid L or at a position equal to the surface Ls (for example, near the surface Ls) while covering the heater 41 in order to define a heat transfer range. Accordingly, the heat from the heater 41 does not directly reach the center or lower part of the liquid L.

In addition, along with the blocking unit 42, the lid Ck of the container prevents heat energy applied into the gas Lg or onto the surface Ls of the gas L from being consumed by the cool air in the cooling space S, and functions to allow the Lg and the surface Ls of the liquid L to maintain a constant temperature.

By means of cooling using the freezing cycle 28 and starting and controlling (turn-on/off of the heater 41) of the operation of the temperature maintaining unit 40, which is the heater 41, as described above, in accordance with the temperature from the first to third sensing units 20a to 20c, the micro controller 30 maintains the temperature of the surface Ls of the liquid L or the temperature of the gas Lg above the surface Ls higher than the temperature of the maximum ice crystal generation zone or higher than the phase transition temperature and constantly performs the cooling of the liquid L, thereby maintaining a supercooled state even below a temperature of the maximum ice crystal generation zone.

Further, the thawing unit 50 is mounted at one side of the cooling space S, preferably, near the region where the container is placed, thereby allowing the micro controller 30 to perform heat generation rapidly upon freezing of liquid or contents.

Figure 8:
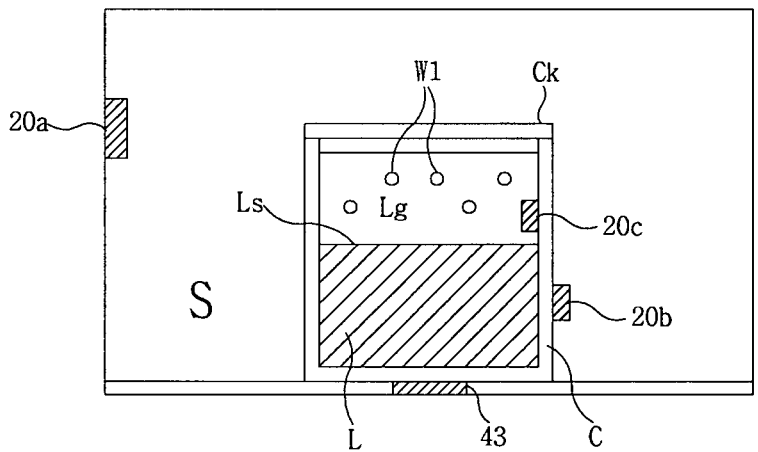

The temperature maintaining unit 40 of FIG. 8 comprises an ultrasonic oscillator 43 formed at the outside bottom surface of the container C. The ultrasonic oscillator 43 generates ultrasonic waves by applied power and transfers them to the container C, liquid L, and gas Lg, and performs a heat generating operation on the inside lower surface of the container C and the surface Ls of the liquid L which have a different median from each other. Especially, the effect of heat generation on the inner lower surface of the container C is small and the amount of heat generation on the surface Ls of the liquid L is considerably large, and this heat generation leads to a rise in the temperature of the surface Ls of the liquid L and temperature of the gas Lg on the surface Ls.

Further, the ultrasonic oscillator 43 is attached to the inner bottom surface of the container C, for executing a heat generation operation only on the surface Ls of the liquid L.

Hereupon, when executing the supercooling operation, the micro controller 30 the on/off of the ultrasonic oscillator 43 so as to maintain a sensed temperature higher than the temperature of the maximum ice crystal generation zone of the liquid L or higher than the phase transition temperature of the liquid L based on the temperature sensed by the third sensing unit 20c.

Figure 9:
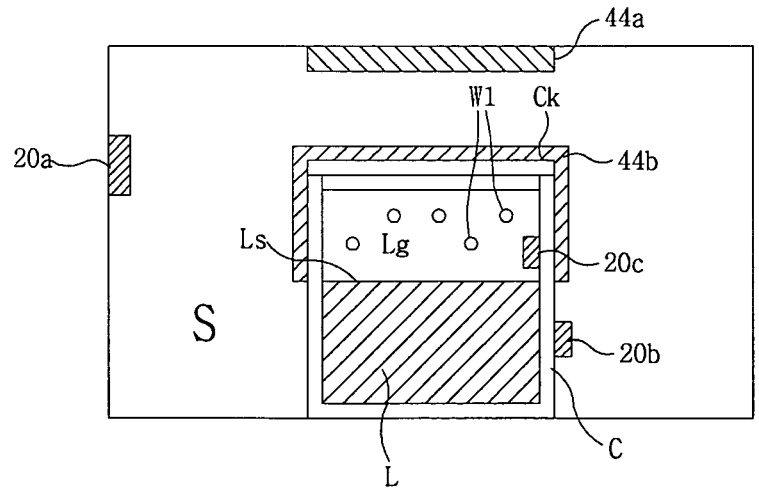

The temperature maintaining unit 40 of FIG. 9 comprises a working coil 44a for generating an electromagnetic force by applied power and a metal part 44b located on the top side of the container C or on the cuter side of the container C above the surface Ls, for generating heat by the electromagnetic force from the working coil 44a. That is, the working coil 44a and the metal part 44b are a heat generator using an induction effect.

As shown in FIG. 9, the working coil 44a is fixedly mounted on an upper side face of the cooling space S, and the metal part 44b is attached to cover the lid Ck of the container C and parts of the sides of the container C, being spaced a predetermined gap apart from the working coil 44a.

The covering region of the metal part 44b is formed with a height greater than or equal to the surface Ls of the liquid L in correspondence with the blocking unit 42 of FIG. 7.

Figure 10:
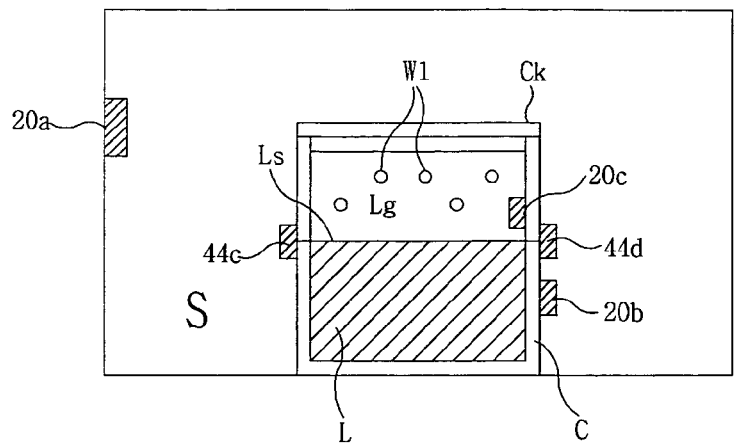

The temperature maintaining unit 40 of FIG. 10 comprises metal electrodes 44c and 44d attached to the positions corresponding to the surface of the liquid L and a voltage unit (not shown) for applying a high voltage pulse or high voltage to the metal electrodes 44c and 44d. Preferably, the container C is formed of a nonconductor through which no electric current can flow.

When the voltage unit applies a voltage or pulse voltage to the metal electrodes 44c and 44d, the voltage or pulse voltage flows through the surface Ls of the liquid L or the vicinity of the surface Ls. That is, most of the voltage flows through the surface Ls of the liquid L or the vicinity of the surface Ls. Due to this conduction, the temperature of the surface Ls of the liquid L or the temperature of the vicinity of the surface Ls is forcibly raised, thereby maintaining the liquid L below a phase transition temperature or a temperature of the maximum ice crystal generation zone, and, as shown in FIG. 4, bringing about the effect of a temperature rise only in a desired region (the surface Ls of the liquid L or the region above the surface Ls).

For this conduction effect, the metal electrodes 44c and 44d have to be located on the surface Ls of the liquid L or near the surface Ls, and it is preferred that the metal electrodes 44c and 44d are adapted such that their attachment position varies up and down because the water level of the liquid L may be varied.

Moreover, in addition to the aforementioned energies, the temperature maintaining unit 40 may have an infrared emitter on the upper side of the container C or the inside of the lid Ck, for emitting infrared rays and forcibly raising the temperature of the surface Ls of the liquid C or the temperature of the gas Lg above the surface Ls.

Figure 11:
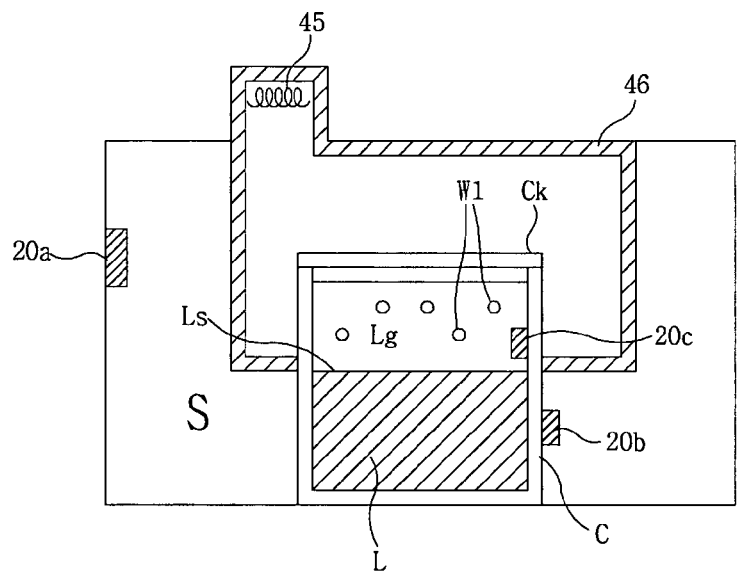
Figure 12:
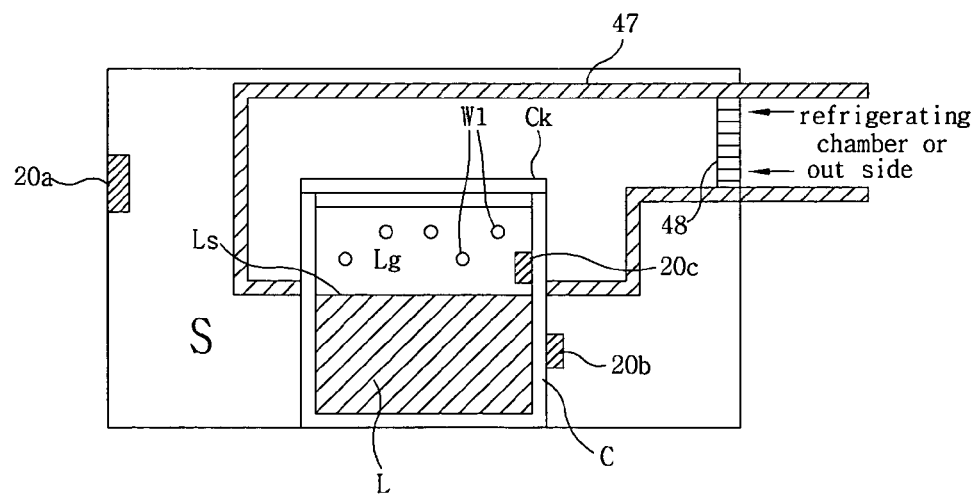
Figure 13:
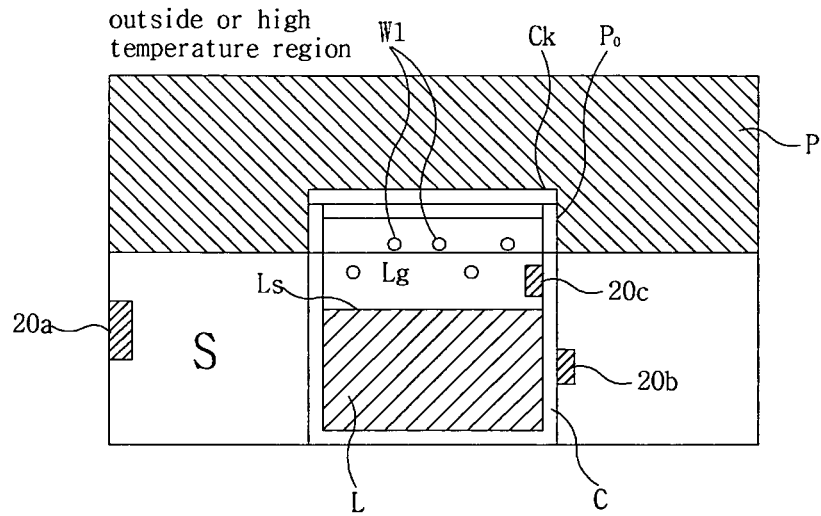

In FIGS. 11 to 13, as the temperature maintaining unit 40, a heat medium supply means is used, which is for allowing a heat median (for example, air, liquid, insulating material, etc.) having a higher temperature than that of the maximum ice crystal generation zone of the liquid L to enter the surface Ls of the liquid L or the upper side of the container C.

The temperature maintaining unit 40 of FIG. 11 comprises a heater 45 for heating air and an inlet duct 46 for guiding the air heated by the heater 45 to the vicinity of the surface Ls of the liquid L or the vicinity of the upper side of the container C. Alternatively, a fan (not shown) may be additionally provided for smooth circulation of the heated air.

Here, the inlet duct 46 executes a heat blocking operation for minimizing the effect of the heated air on the cooling of the cooling space S.

Further, the inlet duct 46, too, is formed with a height greater than or equal to the surface Ls of the liquid L in correspondence with the blocking unit 42 of FIG. 7.

The temperature maintaining unit 40 of FIG. 12 comprises an inlet duct 47 for guiding air having a temperature higher than that of the maximum ice crystal generation zone of the liquid L to the vicinity of the surface Ls of the liquid L or the vicinity of the container C from a refrigerating chamber (not shown) or the outside and a damper 48 for controlling the inflow, shutoff, and influx of air or cool air.

In FIG. 12, the cooling space S is formed inside the freezing chamber, and the inlet duct 47 introduces the cool air or air (generally cooled to be maintained at about 3 to 5° C.) of the refrigerating chamber or introduces indoor or outdoor air (generally of ambient air) from the outside, thereby maintaining the temperature of the surface Ls of the liquid L or the temperature of the gas Lg higher than the temperature of the maximum ice crystal generation zone of the liquid L or the phase transition temperature of the liquid L.

The temperature maintaining unit 40 of FIG. 13 is an insulating material P formed separately within the cooling space S or formed on an inner wall of a general refrigerator.

The insulating material P is provided with a receiving groove Po for inserting part of the container C. The insulating material P may be formed of a foaming agent, for example, urethane.

The insulating material P is disposed between the outside or a high temperature region O and the cooling space S. Thus, if the temperature of the cooling space S is, for example, −18° C., and the temperature of the outside or the high temperature region O is, for example, 30° C., the temperature distribution inside the insulating material P is continuously established in a range of −18 to 30° C. Therefore, as shown in the above-described FIG. 4, a specific region of the insulating material P has a temperature distribution sufficient to apply energy to the surface Ls of the liquid L in the container C or to the gas Lg above the surface Ls. For instance, in case that the upper side of the receiving groove Po can maintain 5° C., if the container C is inserted into the receiving groove Po, the corresponding energy can be applied. However, it is preferred that a sealing member (not shown) or the like is provided for preventing gases, such as the cool air or the like in the cooling space S, from flowing into the receiving groove Po upon the insertion of the container C into the receiving groove Po. The high temperature region O is a device for maintaining a temperature enough to supply required energy to the supercooling apparatus of this invention among various components of, for example, a refrigerator, and may include a condenser, a compressor, etc.

If the container C is not inserted into the receiving groove Po, the inside and sides of the receiving groove Po correspond to the cooling temperature of the cooling space S. On the contrary, if the container C is inserted into the receiving groove Po, the temperature of the receiving groove Po is raised and maintained according to the afore-mentioned temperature distribution. Using such a temperature rise, the liquid L in the container L can be maintained in a supercooled state even below the phase transition temperature or below the temperature of the maximum ice crystal generation zone.

Figure 14:
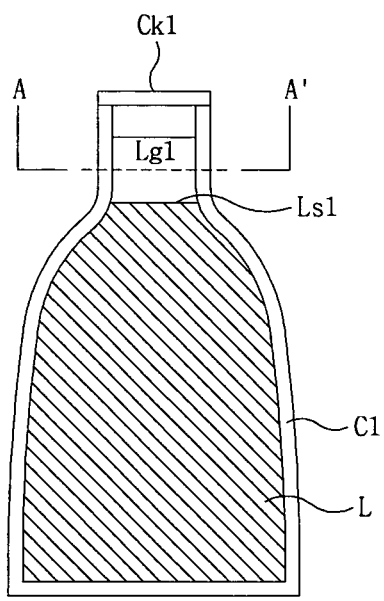
FIGS. 14 and 15 are an embodiment of a container applied to the apparatus for supercooling according to the present invention.
Figure 15:
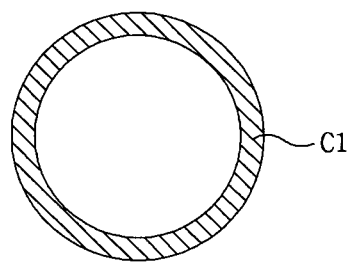

FIGS. 14 and 15 are an embodiment of a container applied to the apparatus for supercooling according to the present invention.

In the container C1 as shown in FIG. 14, the inlet opening of liquid L is formed small so that the surface Ls1 of the liquid L is relatively small or the amount of a gas Lg1 is small, compared to the container C as shown in FIGS. 3 to 13. On the thus formed small-surface Ls1 of the liquid L, the amount of vapor to be evaporated is relatively reduced, and the area contacting the surface Ls1 and the container C1, too, is sharply reduced, thus making it advantageous in maintaining supercooling in the above-described supercooling apparatus of FIG. 4.

In addition, in case of the container C1 of FIG. 14, the amount of varpor evaporated from the liquid L can be reduced, and the amount of energy to be applied by the temperature maintaining unit 40 or the size of the temperature maintaining unit 40 can be reduced, too.

As shown in FIG. 15, a cross section of the container C1 with respect to the line A-A' is curved or rounded to thus uniformly distribute the temperature at the portion where the surface Ls1 of the liquid L is in contact with the container C1.

It is noted that the scope of the invention is not restricted to the embodiments and the drawings, but defined by the appended claims only.

The invention claimed is:

1. An apparatus for supercooling, which can maintain a supercooled state of a liquid or contents even below a phase transition temperature, comprising:

a storage space for storing a container accommodating a liquid or contents containing the liquid;

a cooling means for cooling the liquid or contents or the storage space below the phase transition temperature of the liquid or the contents; and a temperature maintaining unit for applying energy to the surface of the liquid or contents or to a gas near the surface, wherein the liquid or the contents are maintained in a supercooled state by preventing freezing nuclei from being formed on the surface of the liquid or contents or in the gas near the surface by application of the energy.

2. The apparatus for supercooling of claim 1, wherein the temperature maintaining unit maintains the temperature of the surface of the liquid or contents or the temperature of the gas near the surface higher than a temperature of the maximum ice crystal generation zone.

3. The apparatus for supercooling of claim 2, wherein the temperature maintaining unit is a heat medium supply means for allowing a heat transfer medium having a higher temperature than that of the maximum ice crystal generation zone of the liquid or contents to enter the vicinity of the surface of the liquid or contents or the vicinity of the container or to be formed in the vicinity of the surface of the liquid or contents or the vicinity of the container.

4. The apparatus for supercooling of claim 3, wherein the apparatus for supercooling comprises a blocking member for maintaining the cooling of the liquid or contents by the cooling means by blocking the heat transfer medium from the heat medium supply means or the heat from the heat transfer medium.

5. The apparatus for supercooling of claim 3, wherein the heat medium supply means comprises a heater for heating air serving as the heat transfer medium and an inlet duct for guiding the heated air to the vicinity of the surface of the liquid or contents or the vicinity of the container.

6. The apparatus for supercooling of claim 3, wherein the storage space is provided within a freezing chanter, and the heat medium supply means comprises an inlet duct for guiding the cool air or air serving as the heat transfer medium in a refrigerating chamber to the vicinity of the surface of the liquid or contents or the vicinity of the container and a damper for executing the introduction and blocking of the cool air or air in the refrigerating chamber.

7. The apparatus for supercooling of claim 3, wherein the heat transfer medium is formed on the inside surface of the storage space, and a receiving groove is formed for inserting and receiving part of the container.

8. The apparatus for supercooling of claim 7, wherein the receiving groove is formed on an insulation member attached to the storage space.

9. The apparatus for supercooling of claim 2, wherein the apparatus for supercooling comprises a sensing unit for sensing the temperature of the surface of the liquid or contents or the temperature of the gas above the surface and a control means for controlling the temperature maintaining unit according to the sensed temperature.

10. The apparatus for supercooling of claim 2, wherein the apparatus for supercooling comprises a judging means for judging the type of the liquid or contents.

11. The apparatus for supercooling of claim 1, wherein the temperature maintaining unit maintains the temperature of the surface of the liquid or contents or the temperature of the gas near the surface higher than a phase transition temperature.

12. The apparatus for supercooling of claim 1, wherein the cooling means varies the temperature of the liquid or contents by varying the cooling temperature below the temperature of the maximum ice crystal generation zone of the liquid or contents, or fixedly maintains the cooling temperature, thereby controlling the temperature of the liquid or contents in the supercooled state by application of energy and control of the cooling temperature.

13. The apparatus for supercooling of claim 1, comprising a control means for operating the temperature maintaining unit before the cooling temperature by the cooling means reaches the temperature of the maximum ice crystal generation zone of the liquid or contents.

14. The apparatus for supercooling of claim 1, comprising a control means for operating the temperature maintaining unit upon freezing of the liquid or contents unit until freezing is released.

15. The apparatus for supercooling of claim 1, comprising a thawing means for releasing freezing of the liquid or contents upon freezing of the liquid or contents.

16. The apparatus for supercooling of claim 1, wherein the temperature maintaining unit operates in conjunction with an input unit for acquiring a user's input.

17. The apparatus for supercooling of claim 2, wherein the temperature maintaining unit comprises a heat source generating unit for forcibly raising the temperature of at least one of the surface of the liquid or contents, the gas near the surface, and the container.

18. The apparatus for supercooling of claim 17, comprises a blocking member for maintaining the cooling of the liquid or contents by the cooling means by blocking a temperature rise caused by the heat source generating unit.

19. The apparatus for supercooling of claim 17, wherein the heat source generating unit is a heater which is located on the upper side of the container or on the outer side of the container near the surface of the liquid or contents, for generating heat by applied power.

20. The apparatus for supercooling of claim 17, wherein the heat source generating unit is an ultrasonic oscillator is located at the bottom surface of the container or the inside bottom surface of the container, for generating ultrasonic waves by applied power.

21. The apparatus for supercooling of claim 17, wherein the heat source generating unit comprises a heat generating metal part located on the top side of the container or on the outer side of the container near the surface of the liquid or contents and a working coil spaced a predetermined gap apart from the heat generating metal part, for generating an electromagnetic force by applied power heat and allowing the heat generating metal part to execute heat generation.

* * * * *